United States Patent
Morlock et al.

[15] 3,673,177
[45] June 27, 1972

[54] SUBSTITUTED 4-(ANILINOMETHYLENE)-3-GALANTHAMANINONES

[72] Inventors: Elizabeth Benz Morlock, Bronx; Leon Goldman, Nanuet, both of N.Y.

[73] Assignee: American Cyanamid Company, Stamford, Conn.

[22] Filed: May 4, 1970

[21] Appl. No.: 34,591

[52] U.S. Cl. ............... 260/240.3, 260/310 R, 260/346.2 M, 424/285
[51] Int. Cl. .......................................................... C07d 99/04
[58] Field of Search ............................... 260/240.3, 346.2 M

[56] References Cited

OTHER PUBLICATIONS

Barton et al., J. Chem. Soc., 806–17 (1962).

Primary Examiner—Henry R. Jiles
Assistant Examiner—G. Thomas Todd
Attorney—Edward A. Conroy, Jr.

[57] ABSTRACT

This disclosure described compounds of the class of substituted 4-(anilinomethylene)-3-galanthamaninones useful as antibacterial agents and central nervous system depressants.

8 Claims, No Drawings

SUBSTITUTED 4-(ANILINOMETHYLENE)-3-GALANTHAMANINONES

BRIEF SUMMARY OF THE INVENTION

This invention relates to novel substituted 4-(anilinomethylene)-3-galanthamaninones and to methods of preparing these compounds. The novel compounds of the present invention may be represented by the following general formula:

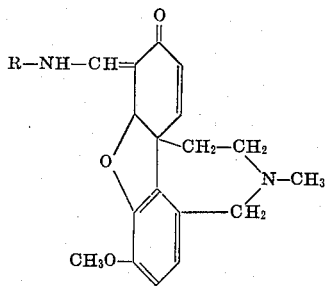

Wherein R is phenyl, p-trifluoromethylphenyl, m-trifluoromethylphenyl or o-trifluoromethylphenyl.

DETAILED DESCRIPTION OF THE INVENTION

The novel compounds of the present invention are, in general, yellow or orange crystalline solids with characteristic melting points and spectral properties. The free bases are soluble in such common organic solvents as lower alkanols, chloroform, methylene chloride, acetone, benzene, N,N-dimethylformamide, dioxane and dimethyl sulfoxide. They are, however, generally insoluble in water.

The organic free bases of this invention form non-toxic acid-addition salts with a variety of organic and inorganic salt-forming reagents. Thus, acid-addition salts, formed by admixture of the organic free base with an equivalent amount of an acid, suitably in a neutral solvent, are formed with such acids as sulfuric, phosphoric, hydrochloric, hydrobromic, citric, lactic, tartaric, acetic, gluconic, ascorbic, and the like. For purposes of this invention, the organic free bases are equivalent to their non-toxic acid-addition salts.

The novel compounds of the present invention may be readily prepared from 3-galanthamaninone (I) in accordance with the following reaction scheme:

wherein R' is a lower alkyl group having up to four carbon atoms, M is an alkali metal, and R is as hereinabove defined. The starting material (I) is 3-galanthamaninone (galanthaminone or narwedine) which has been described by D. H. R. Barton and G. W. Kirby, J. Chem. Soc., 806 (1962) and by G. Combes and J. C. Lefebvre, Bull. Soc. Chim. France, 1805 (1962). Condensation of 3-galanthamaninone (I) with ethyl formate in benzene in the presence of an alkali metal alkoxide (R'OM) at room temperature for a period of time of 2-3 days affords the corresponding 4-(hydroxymethylene)-3-galanthamaninone alkali metal enolate salt (II). Suitable alkali metal alkoxides which may be employed in this condensation are, for example, sodium methoxide, potassium ethoxide, lithium tert-butoxide, and the like. Dissolution of the water soluble 4-(hydroxymethylene)-3-galanthamaninone alkali metal enolate salts (II) in water followed by acidification to pH 7.0 affords the 4-(hydroxymethylene)-3-galanthamaninone (III) as the water soluble inner salt. Both 4-(hydroxymethylene)-3-galanthamaninone (III) and its alkali metal enolate salts (II) are new compounds and are included within the purview of the present invention.

Treatment of 4-(hydroxymethylene)-3-galanthamaninone (III) with an aromatic amine of the formula R–NH$_2$ (wherein R is as hereinabove defined) in ethanol at the reflux temperature for a few hours affords the corresponding 4-(anilinomethylene)-3-galanthamaninone (IV). Similarly, treatment of a 4-(hydroxymethylene)-3-galanthamaninone alkali metal enolate salt (II) with an aromatic amine of the formula R–NH$_2$ in glacial acetic acid at room temperature for 10–20 hours also affords the corresponding 4-(anilinomethylene)-3-galanthamaninone (IV).

Certain of the novel compounds of the present invention (when R is o-, m-, or p-trifluoromethylphenyl) are useful as antibacterial agents and possess broad-spectrum antibacterial activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. The standard sterile nutrient agar solutions containing the different dilutions of the test compounds, along with suitable and comparable control dilutions containing no test compound, are then al-

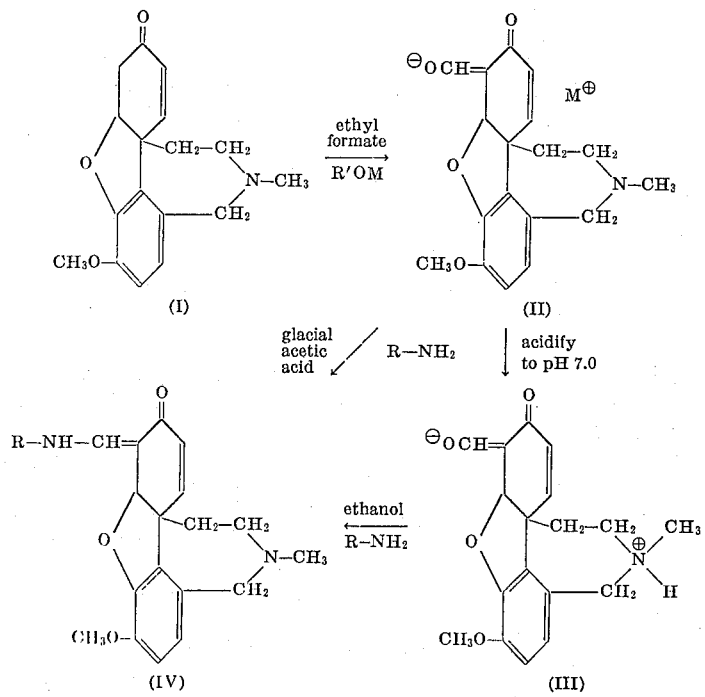

lowed to cool in Petri dishes thereby forming solidified agar plates. The test bacteria are prepared for use by growing in broth overnight. A loopful of each of the live suspensions in sterile physiological saline solution is then, still employing sterile techniques, streaked upon the surfaces of each of the agar plates and the resulting streaked plates are then incubated. After an appropriate period of time, each of the streaks on each of the plates is inspected visually and the extent, if any, of bacterial growth is noted. The minimal inhibitory concentration (expressed in micrograms per milliliter) is defined as the concentration of test compound causing complete inhibition of growth of any particular organism. In a representative operation, and merely by way of illustration, the minimal inhibitory concentration of 4-[($\alpha,\alpha,\alpha$-trifluoro-p-toluidino)methylene]-3-galanthamaninone (1) and 4-[($\alpha,\alpha,\alpha$-trifluoro-m-toluidino)methylene]-3-galanthamaninone (2) against a variety of test organisms as determined in the above-described assay are set forth in the following table:

| Organism | Minimal inhibitory conc. (mcg./ml.) | |
|---|---|---|
| | (1) | (2) |
| *Staphylococcus aureus* ATCC 6538P | 31 | 31 |
| *Streptococcus faecalis* ATCC 8043 | 31 | 31 |
| *Bacillus subtilis* ATCC 6633 | 31 | 31 |
| *Mycobacterium smegmatis* | 15 | |
| *Clostridium sporogenes* ATCC 7955 | | 62 |

Certain of the novel compounds of the present invention are valuable central nervous system depressants of low toxicity and were shown to possess CNS depressant activity as determined by animal experiments as follows. The compound was administered intraperitoneally in a 2 percent starch vehicle to groups of six mice at three or more graded dose levels. At 15-minute and 30-minute intervals after treatment, each animal was placed on the midpoint of a horizontal steel rod (1.55cm. in diameter and about 6 dm. in length), positioned 45.7 cm. above the surface of the table, and forced to walk toward a platform at either end of the rod. The criterion of inability to perform this act was consistent slipping to the side or falling off the rod. The effective dose for reduced rod-walking ability ($RWD_{50}$) was calculated or approximated from the data, and the time of peak effect was estimated from the data. One-half of the $RWD_{50}$ dose was given intraperitoneally to each mouse in groups of five. At the time of peak effect, as determined above, each group of mice was put into the actophotometer for a period of 5 minutes and the motor activity counts were recorded and compared to controls. The compound was administered to additional groups of five mice at graded doses and tested similarly. The dose ($MDD_{50}$) that caused a 50 percent reduction in motor activity was estimated. 4-(Anilinomethylene)-3-galanthamaninone and pyrazolo-[5',4':3,4]galanthamanine were shown to induce ataxia ($RWD_{50}$) at a dose of 250 and 270 mg./kg. of body weight, respectively, and to reduce locomotor activity ($MDD_{50}$) at a dose of 122 and 116 mg./kg. of body weight, respectively.

When mixed with suitable excipients or diluents, the compounds of this invention can be prepared as pills, capsules, tablets, powders, solutions, suspensions, and the like for unit dosage and to simplify administration.

The invention will be described in greater detail in conjunction with the following specific examples.

EXAMPLE 1

Preparation of 4-(hydroxymethylene)-3-galanthamaninone sodium salt and 4-(hydroxymethylene)-3-galanthamaninone To a cooled suspension of 22.0 g. of 3-galanthamaninone in 600 ml. of dry benzene is added 20.79 g. of sodium methoxide and the mixture is allowed to stir for 0.5 hour. Ethyl formate (30 ml.) is added and the deep orange mixture is stirred at room temperature for 3 days. The mixture is filtered and the filtrate is evaporated to dryness under reduced pressure to yield 4-(hydroxymethylene)-3-galanthamaninone sodium salt as a thick red syrup. The syrup is dissolved in 200 ml. of ice-water and the pH of the solution is adjusted to 7.0 by the addition of glacial acetic acid. The resulting solution is extracted successively with methylene chloride and chloroform. During the extraction process a tan solid precipitates from the aqueous solution and this is collected by filtration to yield 8.05 g. of 4-(hydroxymethylene)-3-galanthamaninone as a tan solid, m.p. 144°–149° C. The methylene chloride and chloroform extracts are evaporated to dryness under reduced pressure to yield a thick red syrup which solidifies on trituration with anhydrous ether. Filtration gives 11.8 g. of crude 4-(hydroxymethylene)-3-galanthamaninone.

EXAMPLE 2

Preparation of 4-(anilinomethylene)-3-galanthamaninone

A suspension of 0.100 g. of 4-(hydroxymethylene)-3-galanthamaninone and 0.03 ml. (0.033 g.) of aniline in 10 ml. of absolute ethanol is refluxed for 2 hours. The mixture is cooled to room temperature and filtered to yield 0.054 g. of 4-(anilino methylene)-3-galanthamaninone as yellow needles, m.p. 216°–218° C. (dec.); $\lambda_{max}^{MeOH}$ 229 nm ($\epsilon$22,000), 257 nm ($\epsilon$15,700) and 377 nm ($\epsilon$21,000).

EXAMPLE 3

Preparation of 4-(anilinomethylene)-3-galanthamaninone

To a suspension of 2.50 g. of 4-(hydroxymethylene)-3-galanthamaninone sodium salt in 75 ml. of glacial acetic acid is added 0.73 ml. (0.74g.) of aniline and the mixture is stirred at room temperature for 16 hours. The solution is evaporated under reduced pressure to an orange semi-solid residue. A solution of the residue in 75 ml. of water is made alkaline by addition of concentrated ammonium hydroxide and the resulting yellow precipitate is collected by filtration. Crystallization from absolute ethanol yields 1.68 g. of 4-(anilinomethylene)-3-galanthamaninone as yellow crystals, m.p. 216°–218° C. (dec.).

EXAMPLE 4

Preparation of 4-[($\alpha,\alpha,\alpha$-trifluoro-p-toluidino)methylene]-3-galanthamaninone A suspension of 1.00 g. of 4-(hydroxymethylene)-3-galanthamaninone and 0.518 g. of p-aminobenzotrifluoride in 25 ml. of absolute ethanol is refluxed for 2 hours. The solvent is removed under reduced pressure to yield a deep red syrup as residue. On trituration with ether an insoluable tan solid results which is removed by filtration and the filtrate is evaporated to dryness under reduced pressure to yield a deep red syrup as residue. This residue is chromatographed on 15 g. of alumina (activity III). The column is eluted with benzene and twelve 10-ml. cuts are collected, and then with benzene-ether (3:1) and nine 10-ml. cuts are collected. Cuts 10–22 are combined and evaporated to dryness under reduced pressure to yield 0.230 g. of crude 4-[($\alpha,\alpha,\alpha$-trifluoro-p-toluidino)methylene]-3-galanthamaninone as yellow crystals, m.p. 182°–185° C. Recrystallization from absolute ethanol gives 0.140 g. of 4-[($\alpha,\alpha,\alpha$-trifluoro-p-toluidino)methylene]-3-galanthamaninone as yellow crystals, m.p. 185°–187° C.; $\lambda_{max}^{MeOH}$ 228 nm ($\epsilon$20,800), 262 nm ($\epsilon$16,200) and 370 nm ($\epsilon$22,800).

EXAMPLE 5

Preparation of 4-[($\alpha,\alpha,\alpha$-trifluoro-o-toluidino)methylene]-3-galanthamaninone The procedure of Example 4 is repeated, substituting an equimolar amount of o-aminobenzotrifluoride for the p-aminobenzotrifluoride employed in that example. There is thus obtained the 4-[(α,α,α-trifluoro-o-toluidino)methylene]-3-glaanthamaninone.

EXAMPLE 6

Preparation of 4-[(α,α,α-trifluoro-m-toluidino)methylene]-3-galanthamaninone

A suspension of 0.500 g. of 4-(hydroxymethylene)-3-galanthamaninone and 0.40 m. (0.52 g.) of m-aminobenzotrifluoride in 10 ml. of absolute ethanol is refluxed for 3 hours. The solvent is removed under reduced pressure to yield a yellow semi-solid residue. This is triturated with ether and filtered to yield 0.352 g. of crude 4-[(α,α,α-trifluoro-m-toluidino)methylene]-3-galanthamaninone as a yellow solid. One recrystallization from absolute ethanol gives 0.137 g. of 4-[(α,α,α-trifluoro-m-toluidino)methylene]-3-galanthamaninone as yellow crystals, m.p. 224.5°–225.5° C. (dec.); $\lambda_{max.}^{MeOH}$ 229 nm (ε21,700), 258 nm (ε17,600) and 370 nm (ε22,800).

EXAMPLE 7

Preparation of pyrazolo[5',4':3,4]galanthamanine

A solution of 2.00 g. of 4-(hydroxymethylene)-3-galanthamaninone sodium salt and 0.32 ml. of hydrazine hydrate in 50 ml. of glacial acetic acid is allowed to stir at room temperature for 18 hours. The solvent is removed by evaporation under reduced pressure to yield an orange semi-solid residue. A solution of the residue in water is chilled and made alkaline with concentrated ammonium hydroxide and the resultant orange precipitate is collected by filtration, washed well with water and air-dried. The crude solid is recrystallized from 30 ml. of 50 percent aqueous ethanol to yield 1.04 g. of pyrazolo[5',4':3,4]galanthamanine as pale yellow needles, m.p. 140°–150° C.;$\lambda_{max.}^{H_2O}$ 230 nm (ε10,200), 258 nm (ε5,100) and 280 nm (ε1,700). Pyrazolo[5',4':-3,4]galanthamanine may be represented by the following tautomeric formulas:

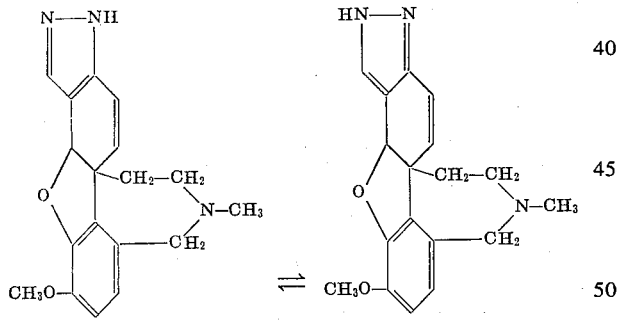

The free base forms non-toxic acid-addition slats with a variety of organic and inorganic salt-forming reagents. Thus, acid-addition salts, formed by admixture of the free base with one or two equivalents of an acid, suitably in a neutral solvent, are formed with such acids as sulfuric, phosphoric, hydrochloric, hydrobromic, citric, lactic, tartaric, acetic, gluconic, ascorbic, and the like.

We claim:

1. A compound selected from the group consisting of those of the formula:

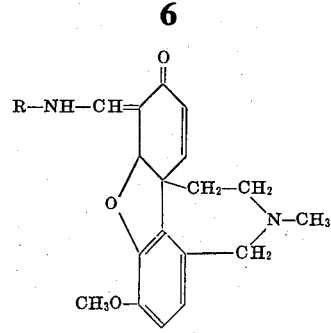

wherein R is selected from the group consisting of [phenyl,]o-trifluoromethylphenyl, m-trifluoromethylphenyl and p-trifluoromethylphenyl; and the non-toxic pharmaceutically acceptable acid-addition salts thereof.

2. A compound according to claim 1 wherein R is o-trifluoromethylphenyl.
3. A compound according to claim 1 wherein R is m-trifluoromethylphenyl.
4. A compound according to claim 1 wherein R is p-trifluoromethylphenyl.
5. The compound 4-(hydroxymethylene)-3-galanthamaninone represented by the formula:

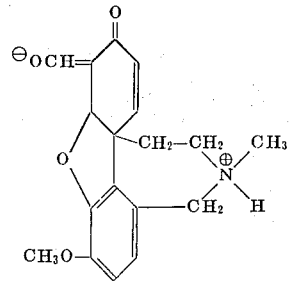

6. A compound of the formula:

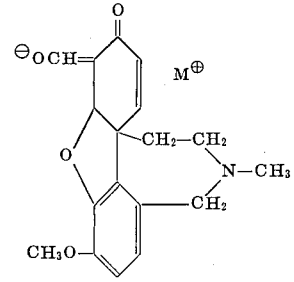

wherein $M^{\oplus}$ is an alkali metal cation.

7. A compound according to claim 6 wherein M is sodium; 4-(hydroxymethylene)-3-galanthamaninone sodium enolate salt.

8. A compound according to claim 6 wherein M is potassium; 4-(hydroxymethylene)-3-galanthamaninone potassium enolate salt.

* * * * *